No. 871,887. PATENTED NOV. 26, 1907.
R. PEDERSON.
WAGON LOADING DEVICE.
APPLICATION FILED APR. 8, 1907.
5 SHEETS—SHEET 1.
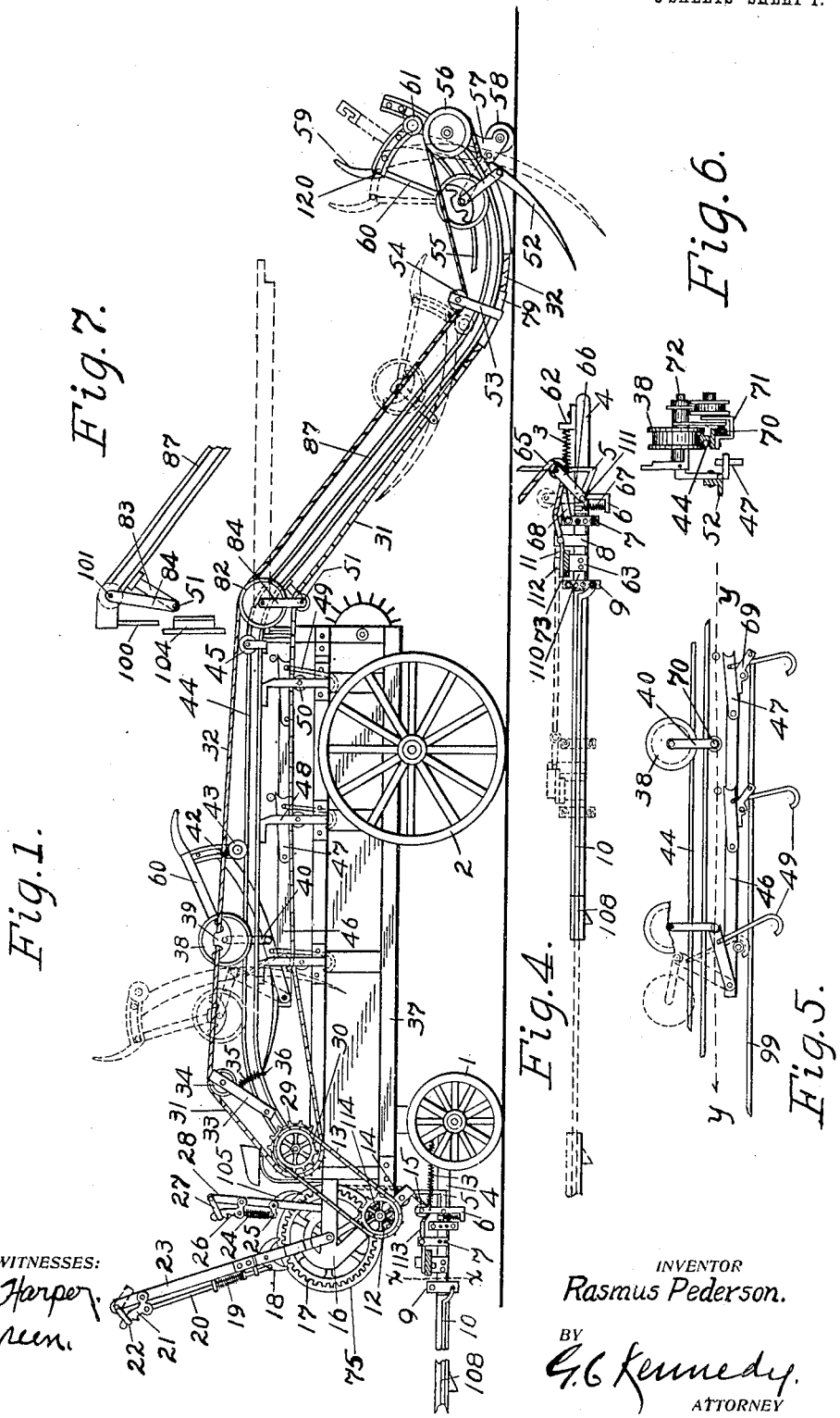
WITNESSES:
H. M. Harper
O. H. Green
INVENTOR
Rasmus Pederson.
BY
G. C. Kennedy
ATTORNEY

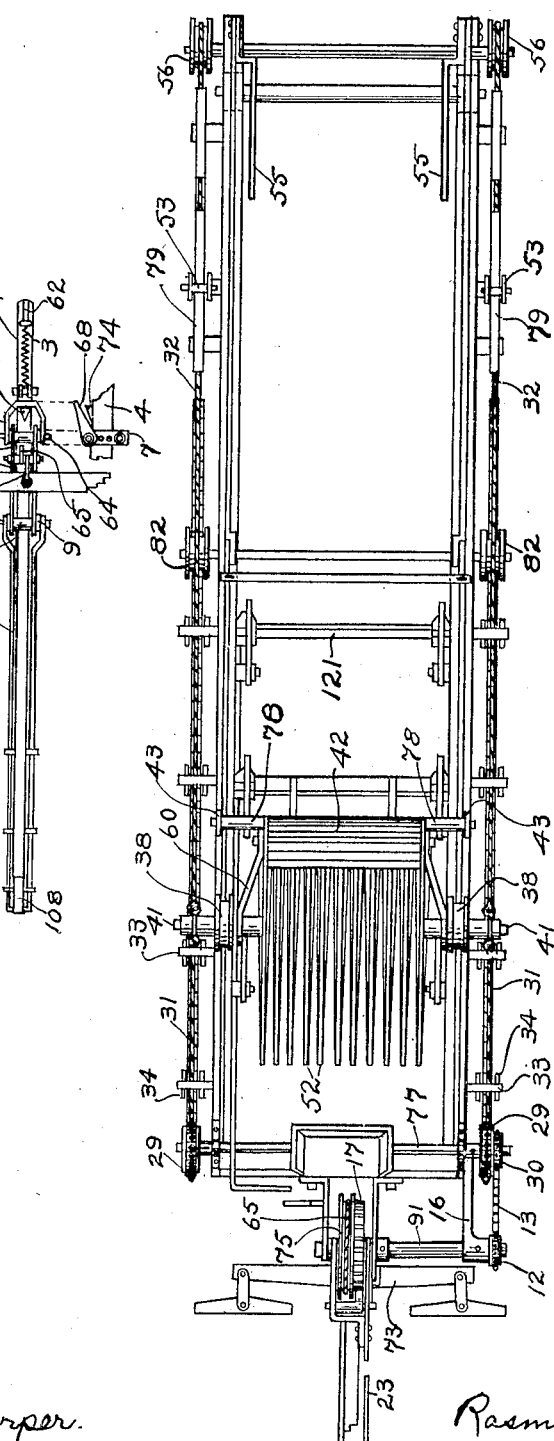

No. 871,887. PATENTED NOV. 26, 1907.
R. PEDERSON.
WAGON LOADING DEVICE.
APPLICATION FILED APR. 8, 1907.
5 SHEETS—SHEET 3.
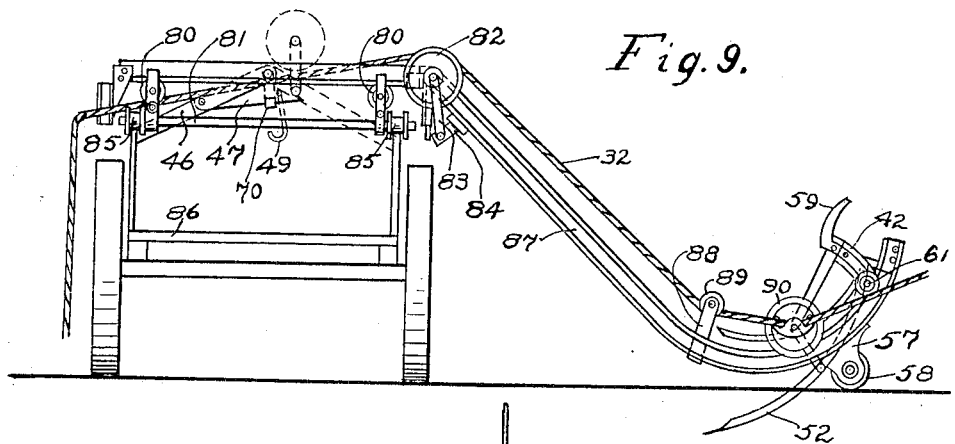
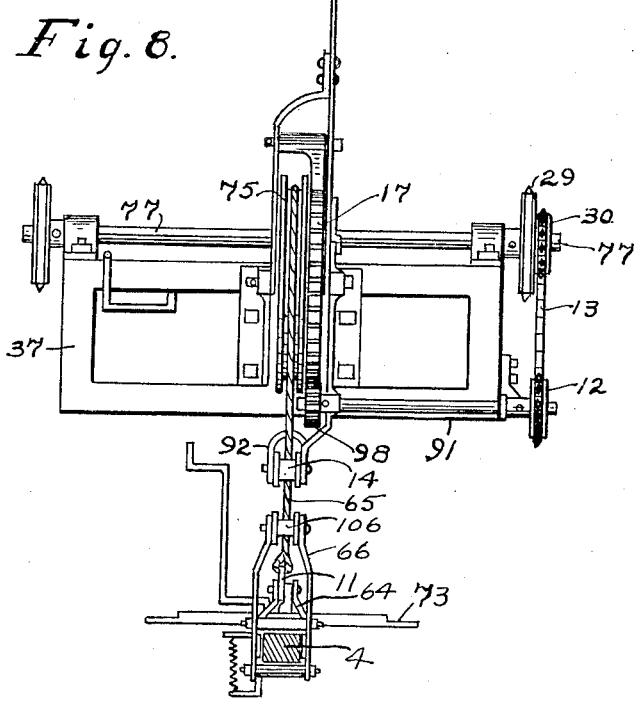
WITNESSES:
H. M. Harper.
C. R. Green.
INVENTOR
Rasmus Pederson
BY
G. C. Kennedy
ATTORNEY No. 871,887. PATENTED NOV. 26, 1907.
R. PEDERSON.
WAGON LOADING DEVICE.
APPLICATION FILED APR. 8, 1907.
5 SHEETS—SHEET 4.
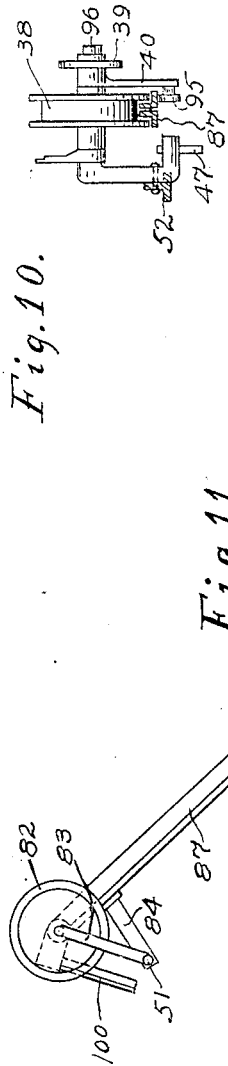
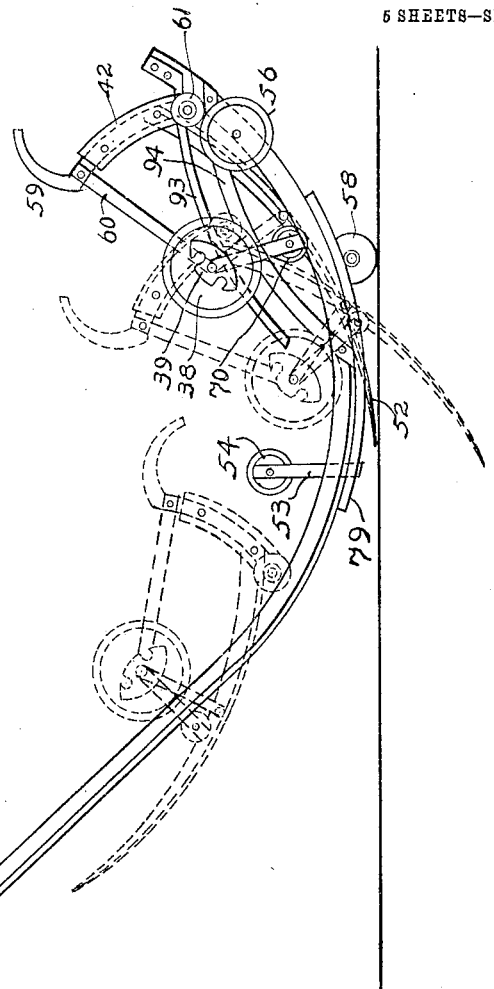
WITNESSES:
H. M. Harper.
C. P. Green.
INVENTOR
Rasmus Pederson
BY
L. C. Kennedy
ATTORNEY No. 871,887. PATENTED NOV. 26, 1907.
R. PEDERSON.
WAGON LOADING DEVICE.
APPLICATION FILED APR. 8, 1907.

5 SHEETS—SHEET 5.

WITNESSES:
H. M. Harper.
C. V. Green

INVENTOR
Rasmus Pederson
BY
G. C. Kennedy
ATTORNEY

UNITED STATES PATENT OFFICE.

RASMUS PEDERSON, OF PARKERSBURG, IOWA.

WAGON-LOADING DEVICE.

No. 871,887.　　　　Specification of Letters Patent.　　　Patented Nov. 26, 1907.

Application filed April 8, 1907. Serial No. 366,922.

*To all whom it may concern:*

Be it known that I, RASMUS PEDERSON, a citizen of the United States of America, and a resident of Parkersburg, Butler county, Iowa, have invented certain new and useful Improvements in Wagon-Loading Devices, of which the following is a specification.

My invention relates to improvements in wagon-loading devices, and has for its object the provision of improved means for loading manure into a wagon or manure spreader; and especially to improve several features of the wagon-loading device which was patented to me by the United States under number 843,695, issued February 12th, 1907. These objects I have accomplished by the mechanism which is hereinafter fully described and claimed, and which is illustrated in the accompanying drawings, in which:—

Figure 12:
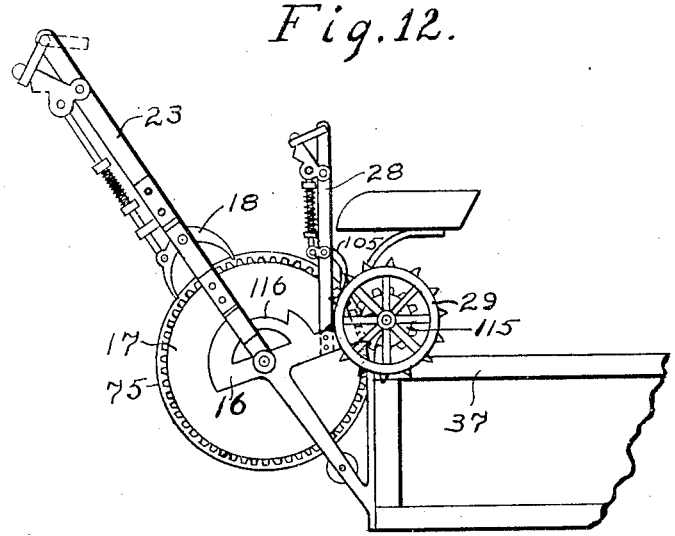
Figures 13, 14:
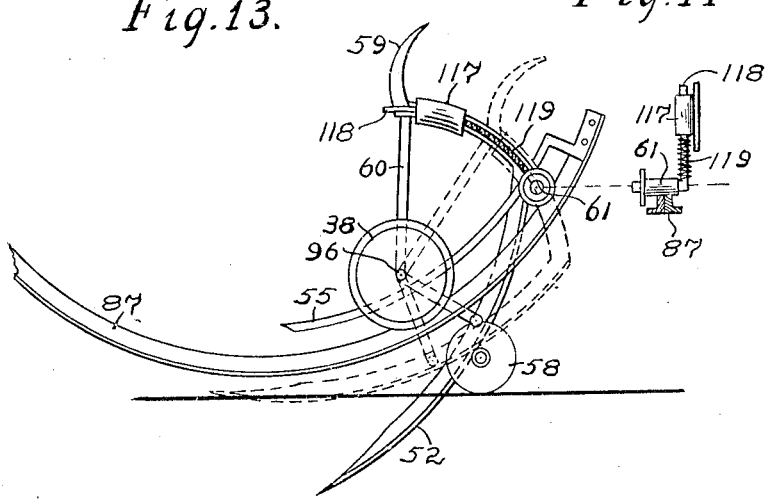

Figure 1 is a side elevation of a wagon having my improved device applied thereto. Fig. 2 is a plan view of the parts shown in Fig. 1. Fig. 3 is a detail plan view of the pole with its connected draft mechanism. Fig. 4 is a side elevation of said pole and mechanism. Fig. 5 is a detail side elevation of that part of the mechanism of the loader wherein the trip-devices are more fully disclosed. Fig. 6 is a detail front elevation of one of the truck-wheels and its guard-roller. Fig. 7 is a detail view of one of the pivotal connections between the horizontal and rear rails. Fig. 8 is a view of the wagon and attachments, principally in front elevation, but with some parts sectioned on the line *x—x* of Fig. 1. Fig. 9 is a view showing a wagon diagrammatically in rear elevation and showing a modified form of my improved device applied thereto. Fig. 11 is an enlarged detail view of the rear portion of the track rails, showing a modified form thereof. Fig. 13 is also another modified detail of the rear portion of the track rails. Fig. 14 being a detail rear elevation of the spring-controlled slide and connections on the toothed scoop. Fig. 10 is a detail end elevation of the track wheel and its guard roller on the rail. Fig. 12 is a detail side elevation of the driving gears of the machine, depicting a simplified form thereof, wherein the gear-wheel attached to the drum acts directly upon the driven pinion on same shaft with the driving sprocket-wheel.

Similar reference numerals refer to similar parts throughout the several views.

Referring to the drawings, the numeral 37 indicates the body of a wagon, preferably a manure-spreader as shown.

The numeral 2 represents the rear wheels, 1 the front wheels, and 4 the pole.

The numeral 44 indicates a pair of laterally spaced guide-rails that are rigidly supported one on each side of the wagon-box 37 by means of the vertical posts 48, the latter fitting detachably in socket-brackets secured on the sides of said box. Pivoted to the rear end of each rail 44 is a vertically-adjustable rail 87, the lower end of which is preferably curved upward and rearward. In Fig. 7 is shown the pivotal connection of the rear rail 87. The forward end of the rail 87 has a downwardly extending bracket 84, to whose lower end is pivoted the lower end of a link 83, the upper end of such link being pivoted on a shaft-bolt 101, also carrying the sheave 82, such bolt being supported by a block having a depending pin 100, the latter adapted to be removably fitted in a bearing-hole in a vertical support 104 set adjacent to the rear end of the rail 44 and supported by the rear end of the body 37, so as to cause the forward end of the rail 87 to contact with the rear end of said rail 44, to form a continuous track for the wheels 38. These rails 87 are adapted to be set in various positions, either inclining downward or extending upward or in a horizontal direction, so as to raise their curved rear ends upon the manure piles of different heights.

On the extreme upturned ends of the rails 87 are mounted guide-sheaves 56, and at the pivotal joints between the rails 44 and 87, but laterally offset outward therefrom, are guide-sheaves 82. Immediately anterior to the guide-sheaves 82 are smaller sheaves 45, supported in brackets from the wagon-box, whose function is to raise the cable 32 sufficiently to permit the truck-wheels 38 to move over the pivotal junction-points of the rails 87 and 44 without interference. On several of the rail-supporting-posts 48 are guide-sheaves 50. Guide-sheaves 34 are also mounted in posts 33 whose lower ends are pivotally connected with the front ends of the rails 44. A curved pin 36 extends downwardly from each of the posts 33 through a staple on the outside of the rail 44, and a spiral spring 35 is sleeved about said pin between said staple and said post to afford a resilient support for the forward end of the cable 32 near the point where it is connected to the sprocket-chain 31. Mounted in suitable bearings on top of and at the front of the box 37 is a transverse shaft 77, which carries at its ends outward of the box and in line with the sheaves before noted driving sheaves or drums 29.

For picking up and carrying the manure I provide a toothed scoop 42, the tines 52 of which are rigidly secured thereto and to the transverse shaft 78. Said scoop has side bracket bars 60 whose ends are connected to the shafts 41, which allows said scoop to be turned to dump its contents. Said shafts 41 carry track-wheels 38, which are properly spaced apart to run upon the upper surfaces of the tracks or rails 44 and their rearward extensions 87.

Working loosely on each trunnion of the shafts 41 are the flat non-rotary shoes 39, that stand in the same plane with the sheaves above noted. On each side of the wagon-box are operating-cables 32, which however form part of an endless power belt, the other portion of such belt being a sprocket-chain 31. The cable or rope part of such belt is placed and adapted to pass about the sheaves above mentioned, while the chain 31 is carried about the drive-sprocket-sheave 29, the engagement thus effected between chain and sprocket-wheel being always positive and secure. The forward end of the cable 32 is carried as far forward as the sheave 34, while the rear end of said cable after passing over the rear sheave 56 and through the boxing 79, is connected to the rear end of the chain 31 at a point a short distance anterior to said boxing, and no part of such chain ever enters said boxing as its rearward limit of movement is always anterior to the boxing. The chain 31 is supported by the sheaves 50 and 51, the latter being pivotally mounted in the brackets 84. The free ends of the rails 87 are preferably provided with ground-wheels 58 mounted in the brackets 57, which adapt the curved rear portions of said rails to be dragged over the ground when it is desired to pick up scattered manure under a forward movement of the wagon.

The shaft 77 which carries the driving-drums 29, is adapted to be rotated in two different ways, to-wit; either by a hand-operated lever or by horse-power. The hand-lever driving-mechanism, as shown, comprises as follows: On one end of the shaft 77 is a sprocket 30, and mounted in suitable bearing-brackets on the front end of the wagon-box is a counter-shaft 91, that is provided at one end, in line with the sprocket 30, with a sprocket 12, over which and the sprocket 30 runs a sprocket-chain 13. The inner end of the shaft 91 terminates over the pole 4 and is provided with a spur-pinion 98, that meshes with a spur-gear 17.

The numeral 23 indicates a latch-lever which is pivoted to the bracket 16 in line with the axis of the gear 17 and has its pawl 18 adapted to be locked in either a forward or back position in a shouldered recessed segment 116 on the upper part of the bracket 16. The lever 23 carries a reversible driving-pawl 18, that is adapted to work upon the teeth of the wheel 17 to drive the same in either of two directions, according to the position in which said pawl is set. By means of the hand-lever 23 and connections just described the two cables 31—32 on each side may be driven in either direction, so as to cause the fork to travel from a filling position at the free ends of the rails 87 above the box 37 or from a dumping position to a filling position.

I have provided a lever 28 at the front end of the box 37, whose lower end is riveted to the bracket 16. Said lever 28 carries a pawl 105 which has a rigid connection with a crank-piece 25, the latter connected by a link to a thumb-piece 26 pivoted to said lever. A swivel 27 is pivoted to the top of said lever. Said thumb-piece 26 has two notches, and when the swivel 27 is hooked in the lowermost notch the pawl 105 is brought into engagement with the teeth of the gear-wheel 17, but when said swivel is hooked into the uppermost notch, the said pawl is held in disengagement from the teeth of said gear-wheel. The spring 24 assists in retracting said pawl when said swivel is changed to the uppermost notch. The lever 28 thus is used to stop the movement of the gear-wheel 17 when desired.

I have shown in Fig. 12 a variation in the driving-gear, introducing a more simple and direct action thereof. In this construction the the shaft 77 is mounted in bearings set nearer the gear-wheel 17, and an intermediate pinion 115 is secured to said shaft between the driving-sprockets 29, such pinion having its teeth intermeshing with the teeth of the gear-wheel 17, and thus such sprockets are directly driven without any intermediate connections such as the gears and counter-shaft 91 shown in Fig. 1.

The horse-power driving device, as shown, is as follows: Rigidly secured to one side of the gear 17 or otherwise secured to the shaft 91, is a large sheave 75, to which is attached one end of a cable or flexible connection 65. The other end of said cable 65 is first passed about a sheave 14 mounted in a block 92 fixed to the lower part of the bracket 16, then about a sheave 106 mounted in uprights 66 attached to the pole 4, and its end then secured to a hook connected with the plate 11, such connection being a cross-piece set in uprights 8 attached to the side-bars 110. The plate 11 has a perforation, in which is set a pivot-bolt which also extends through the horizontal cross-piece of the uprights 63 attached to the side-bars 110. Intermediate of said plate 11 and cross-bar 63 and also pivoted on said bolt 112 is the equalizing-beam 73 of a two-horse evener.

The numerals 7 and 8 indicate side-pieces secured to the side-bars 110, the upper and lower ends of such side-pieces projecting respectively above and below the pole 4 and having anti-friction rollers 107 connecting both their upper and lower ends, such rollers adapted to contact with the upper and lower surfaces of said pole to form anti-friction bearings.

The numerals 10 denote side-rods parallel to and slightly spaced away from the pole 4, and connected at their rear ends to the side-pieces 9, while their front ends are attached to the movable tongue-head 108.

On the upper surface of the rear part of the pole 4 is an upwardly projecting wedge or catch 74 which is adapted to be detachably engaged by a swivel 68 pivoted on the ends 64 of the rearmost upper roller 107.

The numeral 5 denotes a foot-lever whose lower end is bent forward at right angles and fulcrumed on a stud 111 extending laterally from said pole 4. The end of the horizontal member of said lever has a detent which extends upwardly to contact with the under side of the swivel 68, whereby when said lever is moved downward, its detent moving upward will contact with and raise said swivel out of engagement with the projection 74. A hanger 6 depends from the stud 111, and a spring 67 is connected between said hanger and the swivel 68, to cause said swivel to reëngage with the projection 74, when the lever 5 moves upward again. A spring 3 is also connected between the slides 110 and the angle-plate 62 attached to the rear upper surface of the pole 4, to exert a resilient stress upon said slides. The result of thus disengaging the swivel 68 from the projection 74, and the moving forward of the team, is to cause the slides 110 to move forward drawing upon the cable 65, rotating the sheave 75, gear-wheel 17, and its connections with the cables 32 to advance the scoop 52 to its dumping position. When the draft ceases, and the team backs, the equalizing-beam 73 moves backward till the scoop 42 has arrived at its rearmost position, when the swivel 68 assisted by the action of the spring 67, reëngages with the projection 74.

To uprights at the extreme rear ends of the rails 87 are secured the rear ends of the spacing bars 55, which have their forward ends free, and are curved to be parallel with the curved rear portions of said rails. As the scoop 42 moves to its filling position, the inwardly projecting ends of the shafts 41 of the track-wheels 38 ride upon the spacing-bars 55, which thus lift up the tines 52.

The non-rotary shoes 39 on the shaft 96 are attached to the cable 32. The scoop 42 has side plates which are provided on their inner sides with slideways in which the slide-bars 120 attached to the rods 60 may be adjustably secured to vary the elevation of the tines 52 of the scoop.

In Fig. 14 I show a variation of the said device for adjusting the inclination of the tines of the scoop. 118 is a curved rod spaced away from the handle 59 and the bar 60, a sleeve 117 being connected to the latter parts and slidable over said rod 118. The rearward end of the rod 118 is supported by the shaft of the roller 61, and a coiled spring 119 is sleeved about the rod 118 between the sleeve 117 and the shaft-end 61. When the sleeve 117 is pushed back the effect is to elevate the tines 52, as is indicated by the dotted lines in Fig. 13.

I have shown in Fig. 11 still another means for adjusting the position of the scoop at the rear curved end of the rails 87. In this modification the spacing-rails 55 are removed, and other spacing rails 93 substituted, the spacing-rails 93 having a convex upper surface. As indicated by the dotted lines in said Fig. 11, the office of the rails 93 is to cause the tines 52 to automatically first lower and then rise during the operation of filling the scoop.

In Fig. 5 is illustrated the means I have adopted for dumping the scoop 42 when it has arrived at a certain station-point over the box 37. Suspended over the box 37, on each side, is a horizontal bar 46, to which at predetermined distances apart the forks 47 are pivoted. The bifurcation at the free end of each fork is formed to fit over a finger-bar projecting inwardly from a hanger depending from the shaft 96. As the finger-bar moves forward along a line which is indicated by the horizontal dotted line in Fig. 5, it will contact and be received within the bifurcation of whichever fork 47 has been elevated to intercept it. The forks 47, of course, are all elevated together, by the action of drawing forward the rods 99, thus lifting the forward ends of the levers 69 to engage with and elevate such forks, but in use the scoop is allowed to travel over and past one or more of the forks before such forks are elevated, in case it is desired to dump the scoop in the forward part of the wagon-box. The scoop is prevented from tilting forward beyond the vertical position, by means of hooks 49 pivotally suspended from the forks 47, and which catch the cross bars 121, when the dumping position is arrived at. As shown in Figs. 6 and 10, a guard-wheel 95 is pivoted on a stud extending from a hanger 40, the latter pivoted on the shaft 96, such guard-wheel running along the under surface of the rail 44, to prevent the track-wheel 38 from slipping therefrom. A trough 71 may also be suspended from said rail 44 to inclose the wheel 95.

In Fig. 9 is illustrated an adaptation of my device for loading a wagon, when placed transversely thereof. In this form of the device, the same mechanical principles are used as in the other form shown, but the horizontal track-rails are supported on brackets which extend inwardly from the shafts 81 of sheaves 85, the latter running lengthwise of the wagon-box on the upper edges of its sides, so that the device may be shifted lengthwise in its position. A brace or bracket-arm 46 supports the pivoted fork 47 which is sustained in one position by a hanger 70 also suspended from said bracket-arm 46. In like manner the depending hook 49 arrests the scoop 42 from tilting forward. The sheaves 80 are provided for the cable 32 to pass thereunder, and any suitable means of traction may be employed to advance the scoop 42 to the dumping position.

In the Fig. 9 the parts indicated by the numerals 88, 89, and 90 are the same as those depicted in Fig. 1 under numerals 53, 54, and 38 respectively.

When it is desired to return the scoop to the filling position after dumping its load in the desired point in the wagon-box, the rod 99 is moved backward, which throws the scoop into its horizontal position, and releasing the forks 47 and the hooks 49, and then either hand or other power traction may be employed as desired to return the scoop, as hereinbefore described.

Having described my invention, what I claim as new, and desire to secure by Letters Patent, is:—

1. The combination with a wagon, of track-rails extending therefrom to a position for loading, a fork or scoop mounted to travel over said track-rails, from a position for filling into a position for dumping into the wagon-box, trip-fingers pivotally connected to said wagon at different locations from front to rear thereof and arranged to intercept said fork or scoop and cause the same to dump its load into the wagon-box, means for raising and lowering said trip-fingers to cause them to intercept said scoop only at either of such locations, and means for preventing the tilting forward of said fork or scoop beyond its dumping position.

2. The combination with a wagon, of track-rails extending therefrom to a position for loading, a fork or scoop having a crank-like bail with wheels on its trunnions, which wheels run over the upper surface of said track-rails, a hanger suspended from said trunnions having a guard-wheel adapted to run over the under side of said track-rails, means for causing said fork or scoop to travel over said rails, and trips located at different points and arranged to intercept said fork or scoop and cause the same to dump its load into the wagon-box.

3. The combination with a wagon, of track-rails extending therefrom to a position for loading, a fork or scoop mounted to travel over said track-rails, from a position for filling into a position for dumping into the wagon-box, a cable attached to said fork or scoop at both ends, a draft-equalizing beam mounted to slide on the wagon-pole, detachable engaging means between said equalizing-beam and said pole, driving connections between said equalizing-beam and said cable, whereby the power of the horses is rendered available for causing the loaded fork or scoop to travel over said track-rails, and a device operative on said cable to impart return movements to said fork or scoop.

4. The combination with a wagon, of track-rails extending therefrom to a position for loading, a fork or scoop mounted to travel over said track-rails, from a position for filling into a position for dumping into the wagon-box, an endless belt composed in part of a cable and in part of a sprocket-chain connected to each other end to end only, a driving sprocket-wheel in operative engagement with the chain portion only of said endless belt, the said endless belt being attached to a fork or scoop at both ends, and a device operative on said endless belt to impart return movements to said fork or scoop.

5. The combination with a wagon, of track-rails extending therefrom to a position for loading, a fork or scoop mounted to travel over said track-rails, from a position for filling into a position for dumping into the wagon-box, a cable attached to said fork or scoop at both ends, a wheel adapted to move said cable in either direction, a gear adapted to drive said wheel, a lever, a double pawl pivoted to said lever and adapted to engage with and actuate said gear, means for reversing said double pawl to reverse the action of said gear, an upright, and a brake pivotally connected thereto and adapted to be removably engaged with said gear to arrest its movement and the movement of said cable in either direction.

6. The combination with a wagon, of track-rails extending therefrom to a position for loading, a fork or scoop mounted to travel over said track-rails from a position for filling into a position for dumping, and means for adjusting the degree of elevation of the delivery end of said fork or scoop at the beginning of its forward movement from the rearmost ends of said track-rails.

7. The combination with a wagon, of track-rails extending therefrom to a position for loading, a fork or scoop mounted to travel over said track-rails from a position for filling into a position for dumping, and means for causing the excavating forward end of said fork or scoop to automatically dip and then lift in taking in a load at the commencement of its forward movement from its extreme rearmost position.

8. The combination with a wagon, of a wheeled carriage adapted to travel lengthwise thereupon and thereover, track-rails supported upon and by said carriage and extending therefrom to a position for loading, a fork or scoop mounted to travel over said track-rails, from a position for filling into a position for dumping into the wagon-box, a cable attached to said fork or scoop, a crank-like bail on said fork or scoop with wheels on its trunnions adapted to run over said track rails, trip-fingers located at suitable points to engage the crank portion of said bail and cause said fork or scoop to rock and dump its load into the wagon-box, and means for preventing said fork or scoop from tilting forward beyond the vertical position while dumping its load.

Signed at Waterloo, Iowa, this 28th day of March, 1907.

RASMUS PEDERSON.

Witnesses:
O. D. YOUNG,
G. C. KENNEDY.